(12) United States Patent
Hong

(10) Patent No.: US 10,055,217 B2
(45) Date of Patent: *Aug. 21, 2018

(54) CENTRALIZED MANAGEMENT OF MOBILE-ASSISTED MOTOR VEHICLE SOFTWARE UPGRADING AND VEHICLE DATA ANALYTICS

(71) Applicant: Airbiquity Inc., Seattle, WA (US)

(72) Inventor: Leon Hong, Seattle, WA (US)

(73) Assignee: Airbiquity Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,744

(22) Filed: Aug. 28, 2017

(65) Prior Publication Data

US 2017/0357499 A1  Dec. 14, 2017

Related U.S. Application Data

(63) Continuation of application No. 15/154,179, filed on May 13, 2016, now Pat. No. 9,772,839.

(Continued)

(51) Int. Cl.
*G06F 9/44* (2018.01)
*G06F 8/65* (2018.01)
(Continued)

(52) U.S. Cl.
CPC ............... *G06F 8/65* (2013.01); *G07C 5/008* (2013.01); *H04L 47/122* (2013.01); *H04L 67/12* (2013.01); *H04L 67/34* (2013.01); *H04M 1/72525* (2013.01); *H04W 28/0231* (2013.01); *H04W 48/18* (2013.01); *H04M 1/6075* (2013.01); *H04W 84/042* (2013.01); *H04W 84/12* (2013.01); *H04W 88/04* (2013.01)

(58) Field of Classification Search
CPC .......................................................... G06F 9/44
USPC .................................................. 717/171–178
See application file for complete search history.

(56) References Cited

U.S. PATENT DOCUMENTS 9,503,902 B1  11/2016 Coney
9,772,839 B2  9/2017 Hong
(Continued)

FOREIGN PATENT DOCUMENTS

WO  2016183096  11/2016

OTHER PUBLICATIONS

PCT, International Search Report and Written Opinion of the International Searching Authority for International Patent Application No. PCT/US2016/031665, dated Sep. 2, 2016, 11 pages.
(Continued)

*Primary Examiner* — Jae Jeon
(74) *Attorney, Agent, or Firm* — Schwabe, Williamson & Wyatt P.C.

(57) ABSTRACT

In an example, a system is provided and the system includes a motor vehicle component client, a server located in the cloud, and an application to be installed on a personal portable device, such as mobile phone or other portable, mobile electronic device. In some examples, the system enables efficient vehicle software updates to the Engine Control Unit (ECU), the head unit, or the like, or combinations thereof, and/or enables efficient wireless transmission of vehicle data analytics associated with diagnostic information, location information, or the like, or combinations thereof.

18 Claims, 4 Drawing Sheets

Related U.S. Application Data

(60) Provisional application No. 62/161,722, filed on May 14, 2015.

(51) Int. Cl.

| | |
|---|---|
| *H04L 29/08* | (2006.01) |
| *H04M 1/725* | (2006.01) |
| *G07C 5/00* | (2006.01) |
| *H04L 12/803* | (2013.01) |
| *H04W 28/02* | (2009.01) |
| *H04W 48/18* | (2009.01) |
| *H04M 1/60* | (2006.01) |
| *H04W 88/04* | (2009.01) |
| *H04W 84/04* | (2009.01) |
| *H04W 84/12* | (2009.01) |

(56) References Cited

U.S. PATENT DOCUMENTS

| | | | |
|---|---|---|---|
| 2003/0117982 A1 | 6/2003 | Minnick | |
| 2005/0050017 A1* | 3/2005 | Ross | G07C 5/008 |
| 2005/0143879 A1* | 6/2005 | Yasuda | G05B 23/0221 |
| | | | 701/22 |
| 2006/0194566 A1 | 8/2006 | Oesterling | |
| 2007/0005609 A1* | 1/2007 | Breed | B60N 2/2863 |
| 2009/0291637 A1 | 11/2009 | Alrabady | |
| 2013/0238165 A1 | 9/2013 | Garrett | |
| 2013/0304308 A1 | 11/2013 | Maruyama | |
| 2014/0100740 A1 | 4/2014 | Chutorash | |
| 2014/0179274 A1 | 6/2014 | Omeara | |
| 2014/0244104 A1 | 8/2014 | Tan | |
| 2015/0082297 A1 | 3/2015 | Parry | |
| 2015/0215738 A1* | 7/2015 | Frusina | H04W 4/023 |
| | | | 455/426.1 |
| 2016/0335073 A1 | 11/2016 | Hong | |

OTHER PUBLICATIONS

PCT, International Search Report and Written Opinion of the International Searching Authority for International Patent Application No. PCT/US2017/037342, dated Aug. 21, 2017, 10 pages.

Idea.Popcount; "Dissecting SSL Handshake"; https://idea.popcount.org/2012-06-16-dissecting-ssl-handshake/; retrieved online Apr. 3, 2017; 6 Pages.

Schwabe, Williamson & Wyatt P.C.; Related Case Listing; Oct. 16, 2017; Portland, OR; 1 page.

\* cited by examiner

CENTRALIZED MANAGEMENT OF MOBILE-ASSISTED MOTOR VEHICLE SOFTWARE UPGRADING AND VEHICLE DATA ANALYTICS

PRIORITY

This application is a continuation of and claims priority benefit to U.S. patent application Ser. No. 15/154,179, filed May 13, 2016, which is a non-provisional of and claims priority benefit to U.S. Provisional Application No. 62/161,722 filed on May 14, 2015, all of which are herein incorporated by reference in their entirety.

COPYRIGHT NOTICE

© 2015-2016 Airbiquity Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The disclosure pertains to electronic communications by and among a remote server (for example, in the cloud), a motor vehicle, and a portable, mobile device situated in the motor vehicle. Methods and apparatuses are disclosed for downloading selected software from the remote server, through the portable, mobile device to the motor vehicle systems. The disclosure also enables efficient wireless transmission of vehicle data analytics associated with diagnostic information, location information, or the like, from the motor vehicle to the remote server, via the portable, mobile device.

BACKGROUND

A vehicle head unit may utilize a long range radio of a mobile device, such as a mobile phone carried in the vehicle, for the purposes of communications between the vehicle and the remote server associated with centralized management of motor vehicle software applications and services. While this enables the centralized management of the motor vehicle software applications and services without requiring a long range radio to be installed in the vehicle, today vehicle manufacturers may still be reliant on having a long range radio installed in the vehicle for other reasons, such as the upgrading of firmware of vehicle components (including but not limited to the Engine Control Unit (ECU) of the vehicle).

While it is possible to update firmware over a short range wireless connection or wire, the utilization of the short range wireless connection or wire may require delivery of the vehicle to a facility for the update over the short range wireless connection or wire (manual process may need to be performed by a person to update the ECU firmware at the facility). However, delivery of the vehicle to the facility is inconvenient, and for this and other reasons, today vehicle manufacturers may be dependent on having a long range radio installed in the vehicle to support their preferred firmware update procedures.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In an example, a system is provided and the system includes a motor vehicle component client, a server located in the cloud, and an application to be installed on a personal portable device, such as mobile phone or other portable, mobile electronic device. In some examples, the system enables efficient vehicle software updates to the Engine Control Unit (ECU), the head unit, or the like, or combinations thereof, and/or enables efficient wireless transmission of vehicle data analytics associated with diagnostic information, location information, or the like, or combinations thereof.

In one example, a system includes a server in the cloud and a client of a component installed in the motor vehicle. The server provides an application to be installed in a smartphone that may couple to the motor vehicle component by a wire or a short range wireless connection.

The client may collect and aggregate data from a vehicle bus, and handle data transmission via a wire or short range wireless connection to the smartphone. Data may include vehicle data such as CAN (controller area network) data, OBD (on board diagnostic) data including but not limited to OBD II data, GPS (global positioning system) data, SQDF (service and quality data feed based on OBD data), or the like, or combinations thereof. The client may apply a store-and-forward function to temporarily hold a vehicle data set until a connection to the application is established, and the vehicle data is fully uploaded. The client may prioritize high and low priority data set transmission to the application. The client may dynamically collect different sets of vehicle data, change frequency of collection, and adjust other configurations according to a configuration file or other command from the server. The server may communicate with the client to manage a specific data set including a command to collect the specific data set, set a frequency of collection, and adjust other configurations, by pushing a configuration file or other command to the application of the smart phone.

In one example, the server includes a software-over-the-air module to communicate with a software-over-the-air module of the client. The software-over-the-air module of the server may cause a cellular connection to be established to or from the smartphone to download a software update to the application, based on urgency and cost of connection, or may wait until a WiFi connection is available. The client may collect a firmware image from the smartphone and forward to the software-over-the-air module of the client, which may manage onboard firmware upgrade of the head unit, the ECU, or the like, or the like, or combinations thereof.

The application may be downloaded by a user of the smartphone from an "app" store. The application may utilize a store-and-forward function to temporarily hold data received from one of the client or the server, to be forwarded to the other of the server or the client. The application may hold the data until connection to the server or the client is established, and the data is fully transmitted. The application may order forwarding based on priority if more than one forward is stored. The data held by the application may be a software upgrade for the motor vehicle or a data set collected by the motor vehicle.

Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
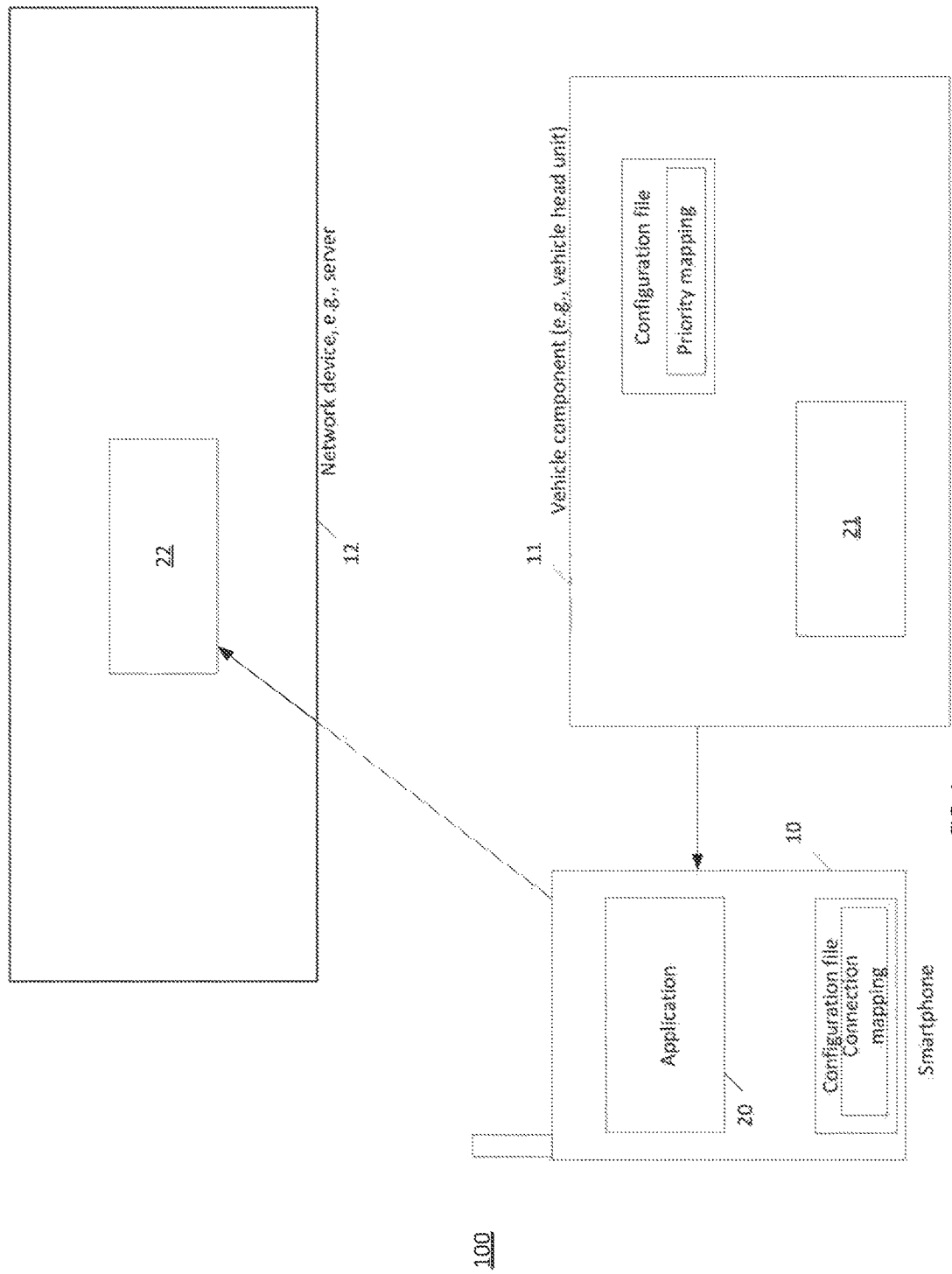
FIG. 1 illustrates a system to update software of vehicle components and/or to obtain information generated by the motor vehicle.

FIG. 1 illustrates a system to update software of vehicle components and/or to obtain information generated by the motor vehicle.

The system 100 includes a network device 12 (such as a server) including a processing device 22 having a software over-the-air module to communicate with a remote application 20 to manage over the air upgrade of motor vehicle component software, e.g. firmware such as ECU firmware, middleware, operating system, application software, or the like, or combinations thereof. An application 20, e.g. an application with software-over-the-air download function, is installed on a personal portable device, such as a smartphone 10 or other portable, mobile electronic device preferably in or near of the motor vehicle. The application 20 is configured to temporarily hold software downloaded from the network device 12 until a connection to a vehicle is established over a short range connection, e.g. a short range wireless connection such as Bluetooth or a wired connection such as USB, with the vehicle. The application 20 may download the software to a processing device 21 of the vehicle, which may be installed on a vehicle component 11 that is installed in the motor vehicle, such as a vehicle head unit. In some examples, the vehicle component 11 may be configured to perform any of the vehicle head unit functions described in more detail in U.S. Patent Publication No. 2014/0179274, which is herein incorporated by reference in its entirety, and the network device 12 may perform any of the backend functions described in more detail in U.S. Patent Publication No. 2014/0179274.

In an example, the processing device 22 may be configured to push a software update to the smartphone 10 via a first cellular connection or a second connection different from the first connection, such as a WiFi connection. In an example, the processing device 22 may be configured to determine whether a particular vehicle component software update is to be pushed via the first cellular connection if the second different connection is not currently available (for instance if the smartphone 11 is not entirely reachable by WiFi or reachable at less than a threshold bandwidth). In an example, the determination is based on factors including but not limited to urgency of the particular vehicle component software update, costs associated with the cellular connection, user settings received by or accessible to the network device 12 and/or smartphone 10, and the like, or combinations thereof. In other examples, the processing device 22 may notify over any connection about a pending update and let application 20 determine based on a configuration file provided by the processing device 22 which wireless network connection is appropriate to pull the software update.

If the particular vehicle component software update is to be pushed via the first connection, the processing device 22 and/or the application 20 may establish a cellular connection to or from the smartphone 10 responsive to the determination. If the particular vehicle component software update is not to be pushed via the first connection, the processing device 22 may queue pushing of the particular vehicle component software update to take place when a second connection to the smartphone 10 becomes available, e.g. wait until a WiFi connection between the smartphone 10 and a wireless network access point is established.

In an example, the processing device 22 may be configured to determine when the smartphone 10 is reachable independently of the cellular radio. In an example, the processing device 22 may be configured to determine when the smartphone 10 connects to a wireless network access point. In an example, the application 20 of the smartphone 10 may be configured to send a signal to the network device 12 responsive to establishing a connection to a wireless network access point. The processing device 22 may determine when the smartphone 10 connects to a wireless network access point using the signal from the smartphone 10.

The application 20 may receive the particular vehicle component software update. The application 20 may hold the downloaded particular vehicle component software update until a short range connection, e.g. a short range wireless connection such as Bluetooth or a wired connection such as USB, is established between the smartphone 10 and the motor vehicle, e.g. between smartphone 10 and vehicle component 11. The application 20 may transmit a software image, e.g. a firmware image, that includes the downloaded particular vehicle component software update and possibly other updates and information to a storage function module of the vehicle component 11.

The processing device 21 may be configured to manage onboard software upgrades for the vehicle. It should be appreciated that the processing device 21 may manage software updates for the vehicle component 11 and other vehicle components (also referred to herein as "remote vehicle components" and which may be coupled via the vehicle bus of the motor vehicle to the vehicle component 11, which may be referred to as a "local vehicle component"). The processing device 21 may retrieve the software image from a storage function module, and implement the software upgrade of the local vehicle component software (e.g., head unit software) or remote vehicle component software. In other examples, this functionality of the processing device 21 may reside in the application 20 to manage software updates for the local vehicle component and other vehicle components.

In some example, the system 100 may also be configured for a wireless transmission of vehicle data analytics functionality, in addition to the functionality of the vehicle components. In such examples, a vehicle analytics module of the processing device 21 may be configured to aggregate data collected from the vehicle bus until a short range connection is established to smartphone 10. The frequency of collection may be controlled by predefined settings and/or information from the vehicle data analytics server module of the processing device 22. The processing device 21 may push the aggregated data to an application 20 with vehicle data analytics of the smartphone 10.

In an example, the aggregated data may include more than one set of data. The processing device 21 may be configured to select an order for uploading the sets of data. The order may be determined based on predefined priority levels, dynamic priority levels signaled by the vehicle data analytics server module of the processing device 22, user settings received by the vehicle data analytics server module, or the like, or combinations thereof.

The application 20 of the smartphone 10 may be configured to hold the aggregated data pushed from the vehicle component 11 if a first connection is not available, e.g. if the smartphone 10 is not connected to a wireless network access point. The application 20 may be configured to determine whether to push a portion of the aggregated data at a different time and/or over a different connection than another portion of the aggregated data. For instance, the application 20 may be configured to identify a first portion of the data. The first portion of the data may be identified based on, e.g. based in part on, user settings accessible to the network device 12. The first portion of the data may include high priority data and/or low volume data.

In response to identifying the first portion of the data, the application 20 may establish a cellular connection to communicate with the network device 12. The application 20 may transmit the identified portion of the data to the network device 12 using the cellular connection. Later, at a different time, responsive to detecting the smartphone 10 connecting to a device independently of the cellular connection, e.g. connecting to a wireless network access point, the application 20 may push another portion of the aggregated data, e.g. the remainder, over a different connection, e.g. a WiFi connection. The vehicle data analytics server module of the processing device 22 may be configured to integrate the received portion(s) of the aggregated data to a database associated with one or more services.

In an example, the application 20 of the mobile phone may be configured to transmit first resolution data, e.g. low resolution, of a portion of the aggregated data and second different resolution data, e.g. high resolution, of the same event of the aggregated data to the network device 12 at different times and/or over different connections. For instance, the processing device 22 or the application 20 may be configured to generate a first data package including a first portion of the aggregated data and a second data package including a second portion of the aggregated data. The first data package may be smaller in bits than the second data package. In an example, the first data package may be associated with a dashboard level details for displaying a trip report, and the second package may be associated with other details for a detailed trip report. In an example, the second data package may include information needed to plot the entire journey on a map together with the incidents/events that occurred through the trip, while the first data package may include dashboard level details such as trip length.

If a WiFi connection is not available when the aggregated data is received by the smartphone 10, the application 20 may be configured to transmit the first data package over a cellular connection. The application 20 may be configured to hold the second data package until a second different connection, e.g. a WiFi connection, becomes available.

In some examples, the processing 22 may download configuration files to the vehicle and the smartphone 10. The configuration file downloaded to the vehicle may include a first mapping, and the configuration file downloaded to the smartphone 10 may include a second mapping that is different than the first mapping. In one example, the first mapping include a priority mapping indicating different priority for different data sets (a first data set of location based data collected as the vehicle is moving may have a lower priority than another data set, such as a data set indicating a status of vehicle components, e.g., a data set including a diagnostic code). The second mapping may be based on user preferences of the user of the smartphone 10. The second mapping may indicate cellular connection for a portion of priorities, e.g., for a subset of the priorities (such as high priority). The second mapping may be utilized for software updates downloaded from the network device 12 to the smartphone 10, and for data sets collected by the vehicle to be uploaded to the network device 12.

The processing device 21 may add information from the first mapping (such as a header to indicate the priority), and the processing device 20 may compare information from the header of a received data set to determine a data channel to be used for the data set (a cellular connection may be established for a data set having a header indicating high priority). The second mapping may indicate different preferences for different regions, e.g., high priority only for a first region, or high priority except low priority for another region. For software updates, the processing 22 may determine whether to download a software update to the vehicle "passively", e.g., queue to download the next time a connection is established between the relevant devices, or not. In some examples, the processing device 22 may cause a software update to be download to the smartphone 10 non-passively, e.g., may cause the application 20 to display a user prompt related to downloading the software update (to instruct a user to connect the smartphone 10 to the vehicle, or the like).

In some examples the processing device 21 may be configured to prioritize high and low priority data set transmission to the application 20. An example of low priority data is location based data collected as the vehicle is moving, and an example of high priority data is information about a status of vehicle components (e.g., an engine overheating). The processing device 21 may perform collection according to a command from the processing device 22. For example, the processing device 21 may collect a specified vehicle data set at a frequency specified by the command.

Some example systems 100 may utilize segmentation. The processing device 21 or 22 may segment the software package or data set into a plurality of segments, and the application 20 may be configured to store a predetermined portion of the software package (e.g., all segments or a subset of the segments) until a predetermined segment (e.g., the last segment) is transmitted to the motor vehicle. The processing device 21 or 22 may determine a physical or a current logical capacity of a memory of the smartphone 10 and/or the vehicle component 11, and may segment according to the determined capacity.

In examples utilizing segmentation, a portion of software update or a data set may be transmitted using a first connection. As a vehicle moves, or for some other reason, the first connection may be terminated, and the system may immediately establish a different connection (e.g., a cellular connection) for remaining one(s) of the segments or wait for another connection to be established, depending on the indicated priority of the software update or the data set.

In examples utilizing segmentation, a subset of the segments may be downloaded to the smartphone 10 to be held until a connection is established between the smartphone 10 and the vehicle or the network device 12. The processing device 21 or 22 may determine a physical or a current logical capacity of a memory of the smartphone 10 and/or the vehicle component 11, and may determine the subset according to the determined capacity and the segment size. Once the connection is established and a portion of the initially download segments are transferred from the smartphone 10, a next subset of the segments may be downloaded to the smartphone 10.

Figure 2:
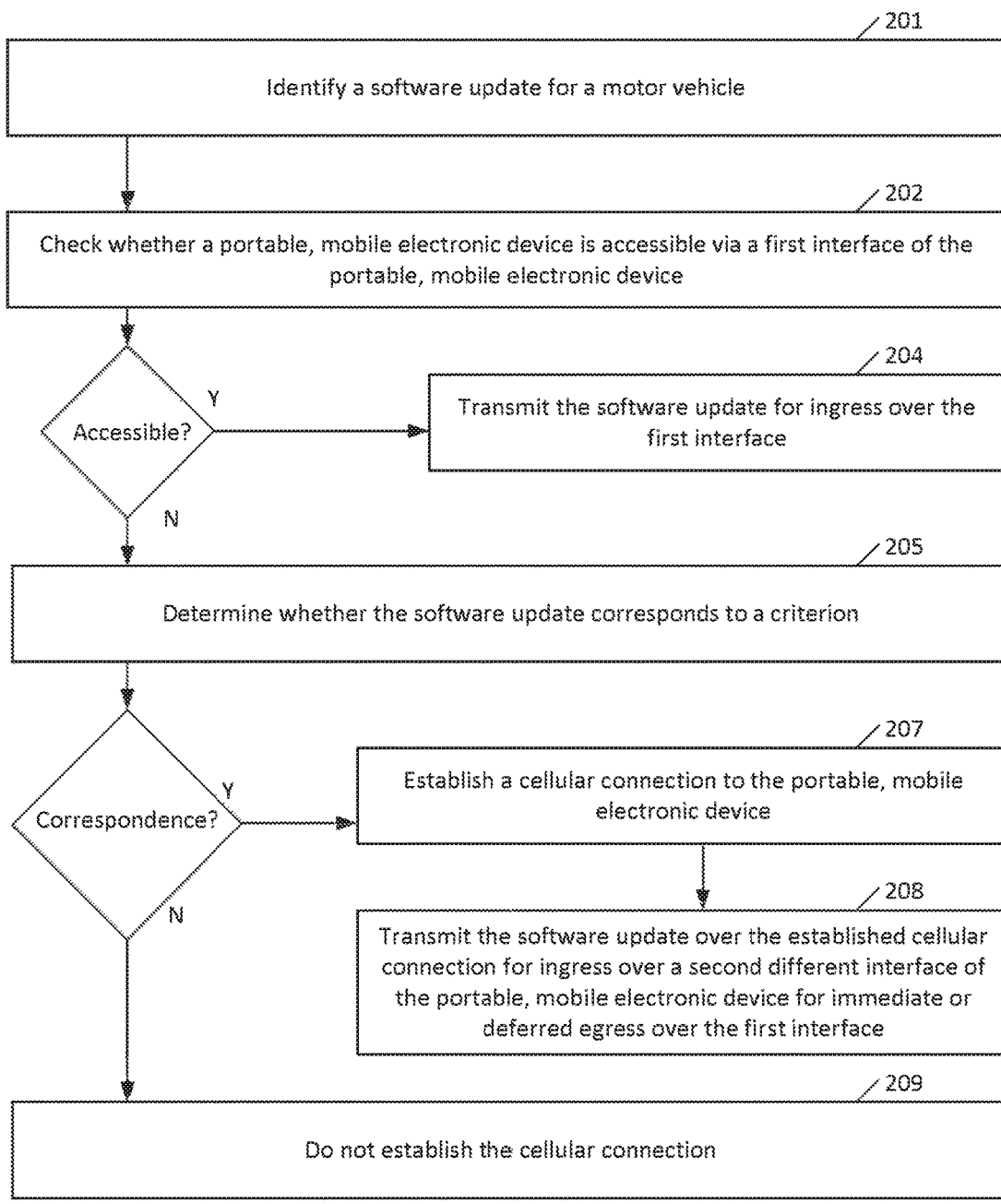
FIG. 2 is a simplified flow chart illustrating some of the principal operations that may be performed by the processing device of the network device of FIG. 1.

FIG. 2 is a simplified flow chart illustrating some of the principal operations that may be performed by the processing device of the network device of FIG. 1.

In block 201, the processing device 22 may identify a software update for a motor vehicle. In block 202, the processing device 22 may check whether a portable, mobile electronic device is accessible via a first interface of the portable, mobile electronic device. The first interface may include a non-cellular interface such as a network interface, e.g., a Wireless Local Area Network (WLAN) interface.

If the portable, mobile electronic device is accessible via the first interface, then in block 204 the processing device 22 may transmit the software update for ingress over the first interface. This may enable the portable, mobile electronic device to transmit the software update to the motor vehicle over a wire or a short range wireless interface, such as Bluetooth®.

If the portable, mobile electronic device is not accessible via the first interface, then in block 205 the processing device 22 may determine whether the software update corresponds to a criterion (e.g., one or more criteria). In an example, the criterion includes whether the software update is for a component of a predetermined group of components of the motor vehicle. The predetermined group may include an Engine Control Unit (ECU) of the motor vehicle, in one example. In an example, the criterion (e.g., one or more criteria) may include a preference indicated by the owner/operator of the portable, mobile electronic device.

If the software update corresponds to the criterion, then in block 207 the processing device 22 may establish a cellular connection to the portable, mobile electronic device. In block 208, the processing device 208 may transmit the software update over the established cellular connection for ingress over a second different interface of the portable, mobile electronic device for immediate or deferred egress over the first interface of the portable, mobile electronic device. (egress may occur, say, when the driver of the motor vehicle powers up the motor vehicle and a short range wireless connection is established between the motor vehicle and a smartphone carried by the driver). The first interface of the portable, mobile electronic device may include a wire or a short range wireless connection.

If the software update does not correspond to the criterion, then in block 209 the processing device 22 does not establish the cellular connection. In one example, the processing device 22 may add the software update to a transmission queue for transmission independently of the cellular connection.

The processing device 22 may subsequently monitor the queue to determine whether any software update of the queue corresponds to the criterion, and transmit the software update from the queue responsive to receiving a signal output from the portable, mobile electronic device over the first interface (the application 20 may be configured to transmit a signal to the server responsive to accessing a wireless network access point over the first interface).

Figure 3:
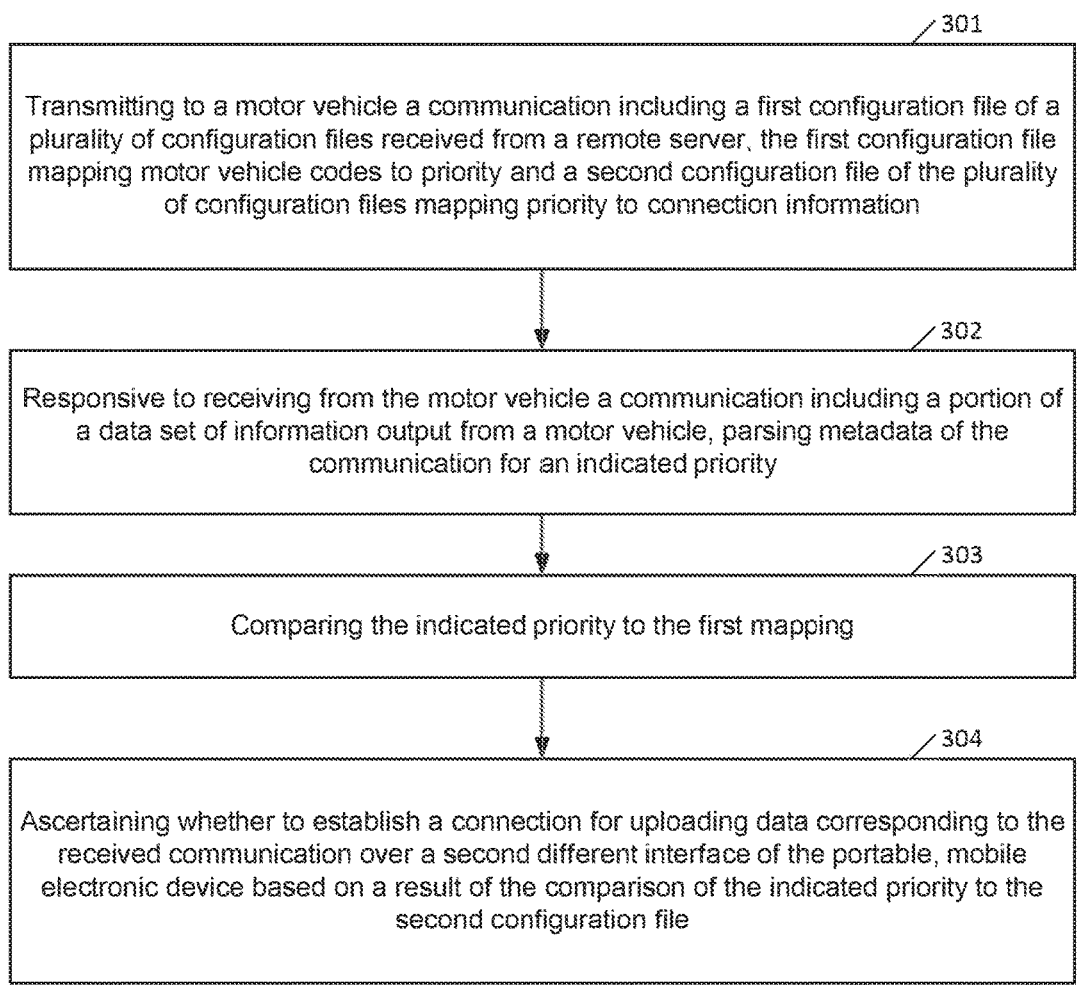
FIG. 3 is a simplified flow chart illustrating some of the principal operations that may be performed by the application of the portable, mobile electronic device of FIG. 1.

FIG. 3 is a simplified flow chart illustrating some of the principal operations that may be performed by the application of the portable, mobile electronic device of FIG. 1.

In block 301, the application 20 may transmit to a motor vehicle a communication including a first configuration file of a plurality of configuration files received from a remote server. The first configuration file may map motor vehicle codes (e.g., diagnostic codes, or the like) to priority. The second configuration file may map priority to connection information. In an example, the connection information is based on, e.g., based at least in part on, a preference indicated by the owner/operator of the portable, mobile electronic device. In an example, the connection information may be service region based, e.g., may delineate different connections for the same priority for different cellular service regions. For instance, for a given priority, the connection information may indicate no cellular connection for one service region, but conversely indicate cellular connection for another service region.

In block 302, the application 20 may, responsive to receiving from the motor vehicle a communication including a portion of a data set of information output from a motor vehicle, parse the metadata of the communication for an indicated priority. In block 303, the application 20 may compare the indicated priority to the first mapping. In block 304, the application 20 may ascertain whether to establish a connection for uploading data corresponding to the received communication over a second different interface of the portable, mobile electronic device based on a result of the comparison of the indicated priority to the second configuration file.

Figure 4:
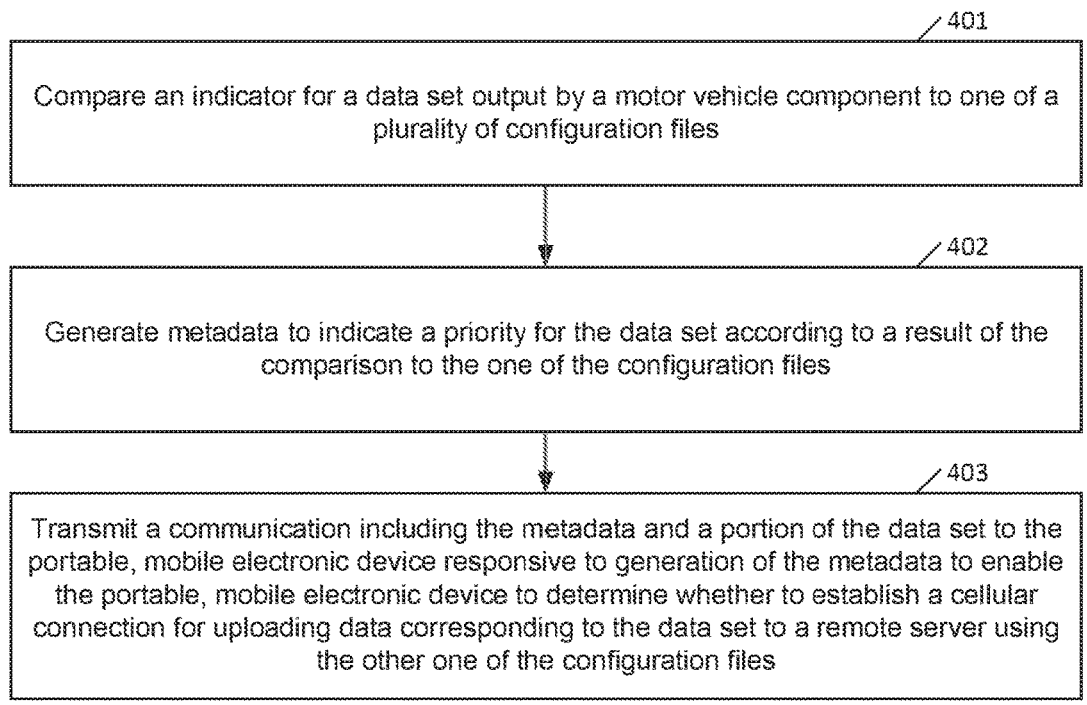
FIG. 4 is a simplified flow chart illustrating some of the principal operations that may be performed by the processing device of the motor vehicle component of FIG. 1.

FIG. 4 is a simplified flow chart illustrating some of the principal operations that may be performed by the processing device of the motor vehicle component of FIG. 1.

In block 401, the processing device 21 may compare an indicator for a data set output by a motor vehicle component, e.g., a head unit, an ECU, etc., to one of a plurality of configuration files. In block 402, the processing device 21 may generate metadata to indicate a priority for the data set according to a result of the comparison to the one of the configuration files. In block 403, the processing device 21 may transmit a communication including the metadata and a portion of the data set (e.g., an entire data set portion, in some examples) to the portable, mobile electronic device responsive to generation of the metadata to enable the portable, mobile electronic device to determine whether to establish a cellular connection for uploading data corresponding to the data set to a remote server using the other one of the configuration files.

Examples

One example is a system including a server configured to: identify a software update for a vehicle; check whether a smartphone is accessible via a network interface of the smartphone; in response to the smartphone not being accessible via the network interface of the smartphone, determine whether the software update matches a criterion, wherein the criterion is whether the software update is for a predetermined component of the vehicle, wherein the predetermined component comprises an Engine Control Unit (ECU) of the vehicle; in response to determining that the software update is for the predetermined component of the vehicle, establish a cellular connection to the smartphone; and transmit the software update for the predetermined component of the vehicle.

In one example, the server is further configured to: in response to determining that the software update is not for the predetermined component of the vehicle, queue the software update for transmission to the smartphone independently of the cellular connection.

In one example, the smartphone is configured to transmit a signal to the server responsive to accessing a wireless network access point.

Another example is a system including a server configured to: identify a software update for a vehicle; check whether a portable, mobile electronic device is accessible via a network interface of the portable, mobile electronic device; in response to the portable, mobile electronic device not being accessible via the network interface of the portable, mobile electronic device, determine whether the software update matches a criterion; in response to determining that the software update matches the criterion, establish a cellular connection to the portable, mobile electronic device; and transmit the software update for the predetermined component of the vehicle.

In one example, the server is further configured to: in response to determining that the software update does not match the criterion, add the software update to a transmission queue for transmission independently of the cellular connection.

In one example, the server is further configured to: monitor the queue to determine whether any software update of the queue matches the criterion; and transmit the software update from the queue via the same or another cellular connection responsive to a result of the monitoring.

In one example, the portable, mobile electronic device is configured to transmit a signal to the server responsive to accessing a wireless network access point.

In one example, the system includes a vehicle head unit, wherein: the vehicle head unit is configured to aggregate data collected from a vehicle bus until a short range connection is established between the vehicle head unit and the portable, mobile electronic device; and the vehicle head unit is configured to push the aggregated data to the portable, mobile electronic device over the short range connection.

In one example, the vehicle head unit is configured to select an order for transmitting a plurality of sets of data of the aggregated data.

In one example, the portable, mobile electronic device is configured to identify a first portion of the aggregated data if no wireless network access points are accessible via the network interface of the portable, mobile electronic device; the portable, mobile electronic device is configured to establish a cellular connection and transmit the first portion of the aggregated data over the cellular connection; and the portable, mobile electronic device is configured to transmit a second different portion of the aggregated data to the server independently of a cellular radio of the portable, mobile electronic device.

In one example, at least one of the vehicle head unit and the portable, mobile electronic device is configured to: generate a first data package including first information related to an event associated with the aggregated data; and generate a second data package including second different information related to the same event.

In one example, the first data package includes less bits than the second data package.

In one example, the portable, mobile electronic device is configured to transmit the first data package to the server over said the cellular connection at a first time and the second data package to the server at a second time that is later than the first time.

In one example, the server is configured to generate a first trip report responsive to receiving the first data package and a second trip report responsive to receiving the second data package.

In one example, generating the first trip report comprises generating a dashboard level display of the event.

Most of the equipment discussed above comprises hardware and associated software. For example, the typical navigation device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:
1. A system including a portable, mobile electronic device, the portable, mobile electronic device including a memory having instructions stored thereon that, in response to execution by a processing device of the portable, mobile electronic device, cause the processing device of the portable, mobile electronic device to perform operations comprising:

downloading, from a remote server, a configuration file of a pair of configuration files, wherein a first configuration file of the pair includes a mapping indicating different priorities for different types of data sets generated by a motor vehicle, and a second configuration file of the pair maps priority to connection information, wherein the connection information is based on service region or user preference, wherein the downloaded configuration file comprises the second configuration file of the pair;

identifying a communication from the motor vehicle, the communication including content of a data set of information output from the motor vehicle and metadata indicating one of the priorities of the first configuration file;

parsing the metadata of the identified communication to identify the indicated priority;

comparing the indicated priority to the second configuration file;

determining a data channel for uploading, to the remote server, the content using the connection information of the second configuration file, and based on the indicated priority;

checking whether the remote server is reachable over a first interface of the portable, mobile electronic device;

uploading a portion of the content to the remote server over the first interface in the case that the remote server is reachable over the first interface; and uploading the portion of the content to the remote server over a second interface of the portable, mobile electronic device, conditioned on at least one value of the connection information of the second configuration file in the case that the remote server is not reachable over the first interface.

2. The system of claim 1, wherein the operations further comprise uploading a first subset of said content to the remote server on one of the first and second interfaces, and uploading a second subset of said content to the remote server on the other one of the of the first and second interfaces.

3. The system of claim 2, wherein the first subset of said content includes at least one of vehicle speed information, engine speed information, odometer information, or ignition status information.

4. The system of claim 2, wherein the second subset of said content includes at least one of location information or instantaneous fuel economy information.

5. The system of claim 1, wherein the operations further comprise caching the portion of the content in the case that the portion of the content is not uploaded to the remote server over the second interface.

6. The system of claim 1, wherein the portable, mobile electronic device is communicatively coupled to the motor vehicle over at least one of a wired or short range wireless connection.

7. The system of claim 1, wherein the first interface includes a WLAN (wireless local area network) interface.

8. The system of claim 1, wherein the operations further comprise:

segmenting the content into a plurality of segments;

beginning upload of the plurality of segments to the remote server over a first connection;

if communication with the remote server over the first connection is disrupted prior to uploading all of the plurality of segments, selecting an action, based on the at least one value of the connection information, the action comprising at least one of caching a remaining segment of the plurality of segments, caching the plurality of segments, or uploading said remaining segment to the remote server over a second different connection; and executing the selected action.

9. The system of claim 1, further comprising:

a motor vehicle component installed in the motor vehicle, the motor vehicle component including a memory having instructions stored thereon that, in response to execution by a processing device of the motor vehicle component, cause the processing device of the motor vehicle component to perform operations comprising:

collecting a vehicle data set from a vehicle bus installed in the motor vehicle;

associating the collected data set to a motor vehicle code;

comparing the motor vehicle code for the data set to the first configuration file to identify a result and generating the metadata that indicates the priority responsive to the result; and transmitting the communication to the portable, mobile electronic device, the communication including said content and said metadata.

10. A computer-implemented method, comprising:

obtaining, by a processor of a portable, mobile electronic device situated in a motor vehicle, a configuration file of a pair of configuration files, wherein a first configuration file of the pair includes a mapping indicating different priorities for different types of data sets generated by the motor vehicle, and a second configuration file of the pair maps priority to connection information, wherein the connection information is based on service region or user preference, wherein the obtained configuration file comprises the second configuration file of the pair;

generating, by a processor of the motor vehicle, a communication including content of a data set of information output from the motor vehicle and metadata indicating one of the priorities of the first configuration file and passing the communication to the processor of the portable, mobile electronic device, wherein the processor of the portable, mobile electronic device comprises a first processor and the processor of the motor vehicle comprises a second different processor;

parsing, by the first processor, the metadata of the communication to identify the indicated priority;

comparing the indicated priority to the second configuration file;

determining a data channel for uploading, to a remote server, the content using the connection information of the second configuration file, and based on the indicated priority;

checking whether the remote server is reachable over a first interface associated with the motor vehicle;

uploading a portion of the content to the remote server over the first interface in the case that the remote server is reachable over the first interface; and uploading the portion of the content to the remote server over a second interface associated with the motor vehicle, conditioned on at least one value of the connection information of the second configuration file in the case that the remote server is not reachable over the first interface.

11. The computer-implemented method of claim 10, further comprising uploading a first subset of said content to the remote server on one of the first and second interfaces, and uploading a second subset of said content to the remote server on the other one of the of the first and second interfaces.

12. The computer-implemented method of claim 11, wherein the first subset of said content includes at least one of vehicle speed information, engine speed information, odometer information, or ignition status information.

13. The computer-implemented method of claim 11, wherein the second subset of said content includes at least one of location information or instantaneous fuel economy information.

14. The computer-implemented method of claim 10, wherein the operations further comprise caching the portion of the content in the case that the portion of the content is not uploaded to the remote server over the second interface.

15. The computer-implemented method of claim 10, wherein the first processor is communicatively coupled to the second processor by at least one of a wired or short range wireless connection.

16. The computer-implemented method of claim 10, wherein the first interface includes a WLAN (wireless local area network) interface.

17. The computer-implemented method of claim 10, further comprising:
segmenting the content into a plurality of segments;
beginning upload of the plurality of segments to the remote server over a first connection;
if communication with the remote server over the first connection is disrupted prior to uploading all of the plurality of segments, selecting an action, based on the at least one value of the connection information, the action comprising at least one of caching a remaining segment of the plurality of segments, caching the plurality of segments, or uploading said remaining segment to the remote server over a second different connection; and
executing the selected action.

18. The computer-implemented method of claim 10, further comprising:
collecting a vehicle data set from a vehicle bus installed in the motor vehicle;
associating the collected data set to a motor vehicle code; and
comparing, by the second processor of the motor vehicle, the motor vehicle code for the data set to the first configuration file to identify a result and generating the metadata that indicates the priority responsive to the result;
wherein the communication includes said content and said metadata.

* * * * *